Nov. 25, 1941.   R. V. GRAYSON   2,263,696
AUTOMATIC MACHINE FOR DEVEINING SHRIMP
Filed Dec. 28, 1939   4 Sheets-Sheet 3
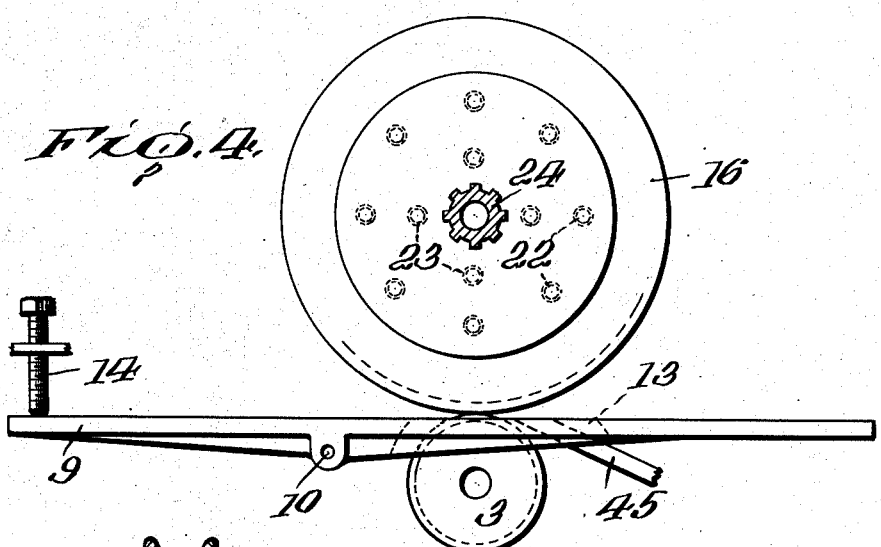
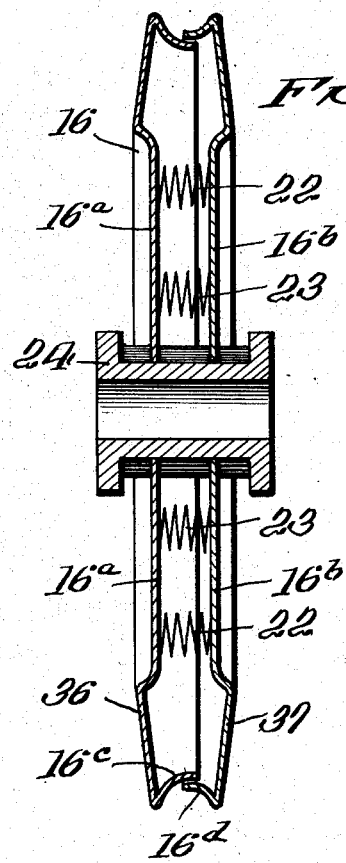
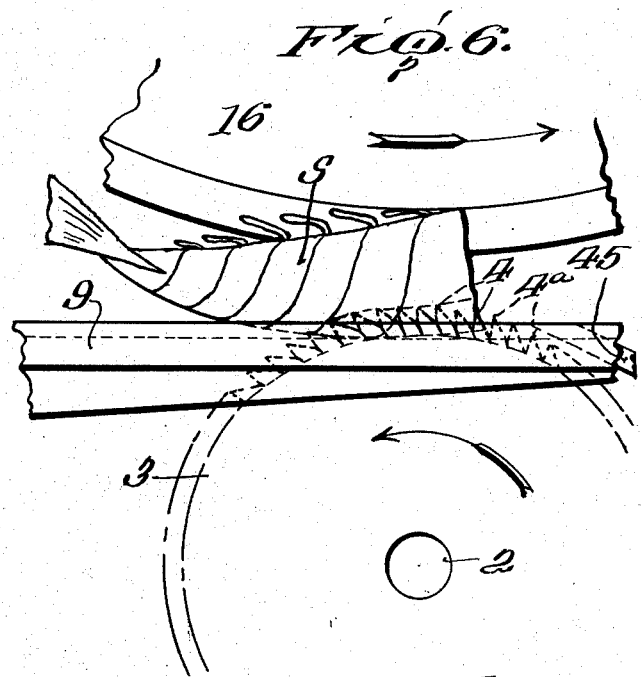
INVENTOR
Ralph V. Grayson
By Mason & Porter
ATTORNEYS Nov. 25, 1941.    R. V. GRAYSON    2,263,696
AUTOMATIC MACHINE FOR DEVEINING SHRIMP
Filed Dec. 28, 1939    4 Sheets-Sheet 4
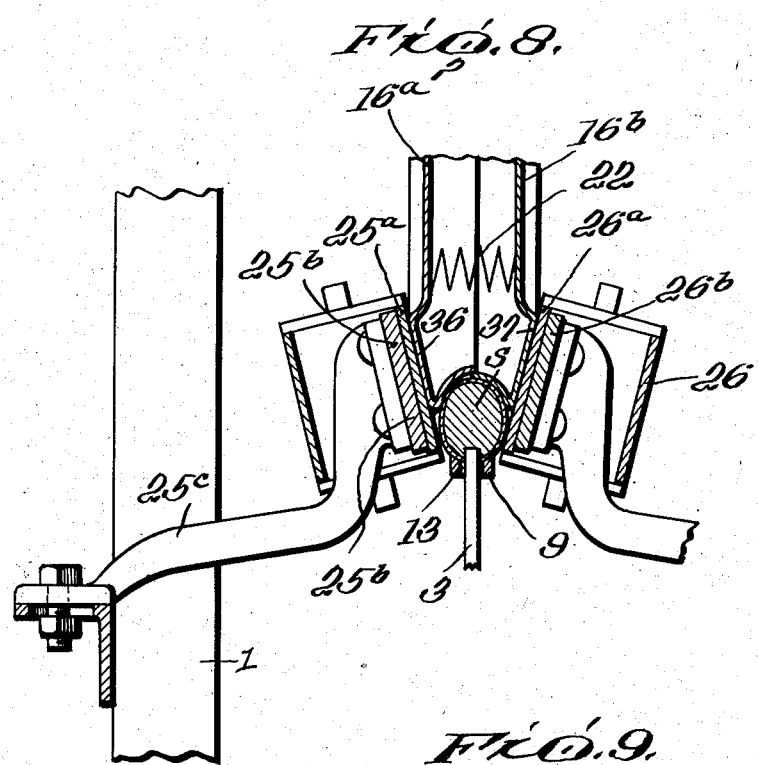
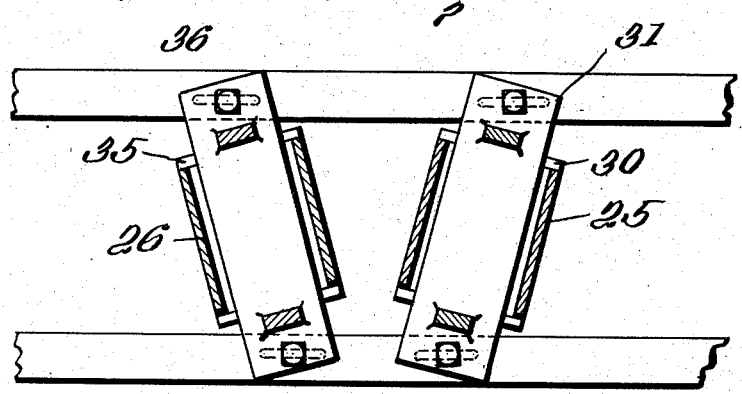
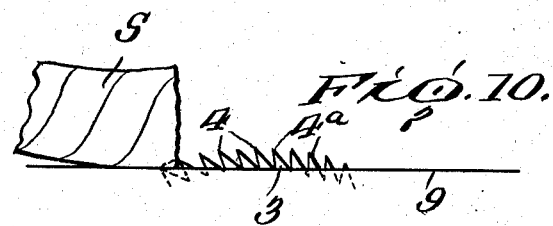
INVENTOR
Ralph V. Grayson
BY Mason & Porter
ATTORNEYS Patented Nov. 25, 1941

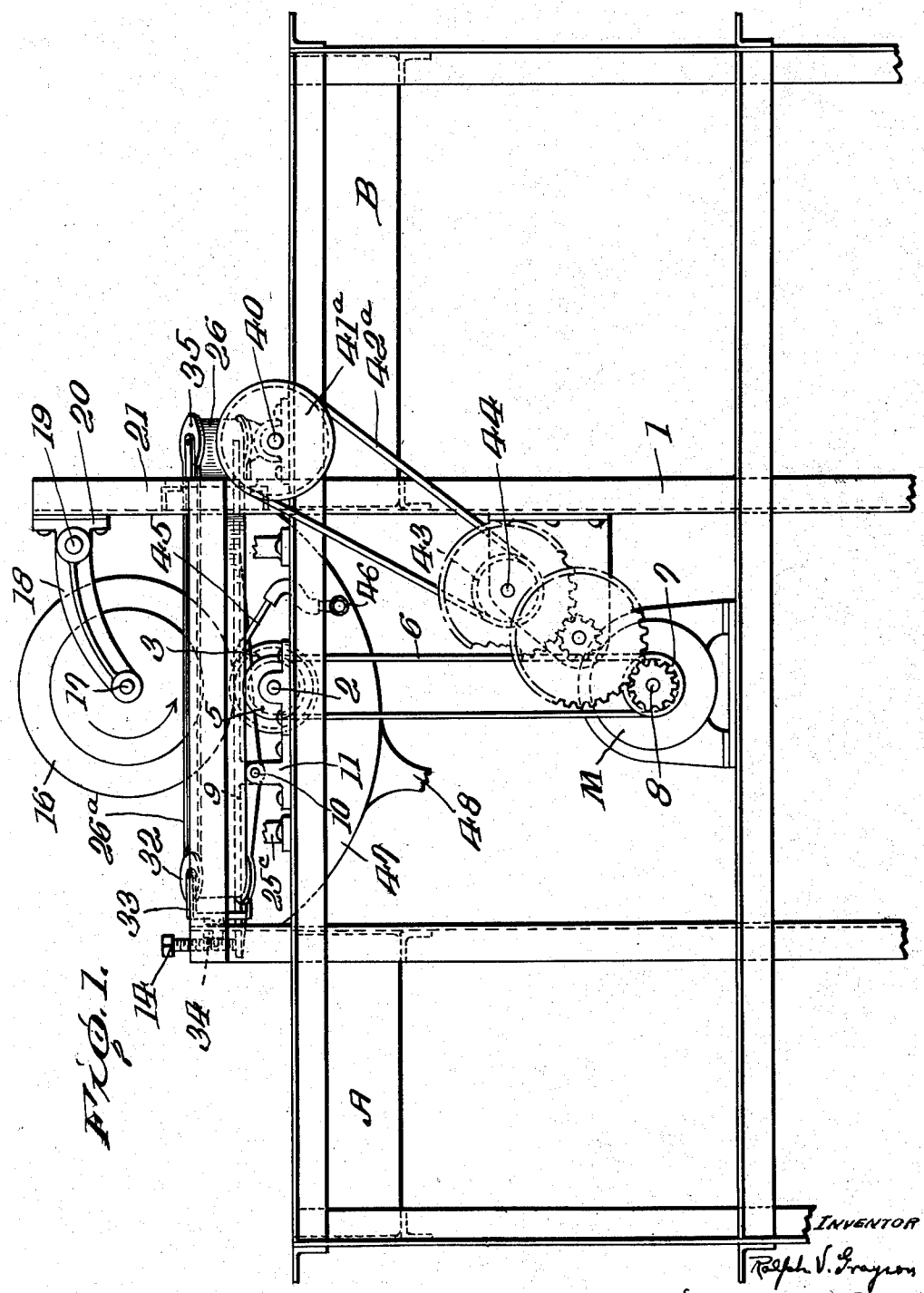

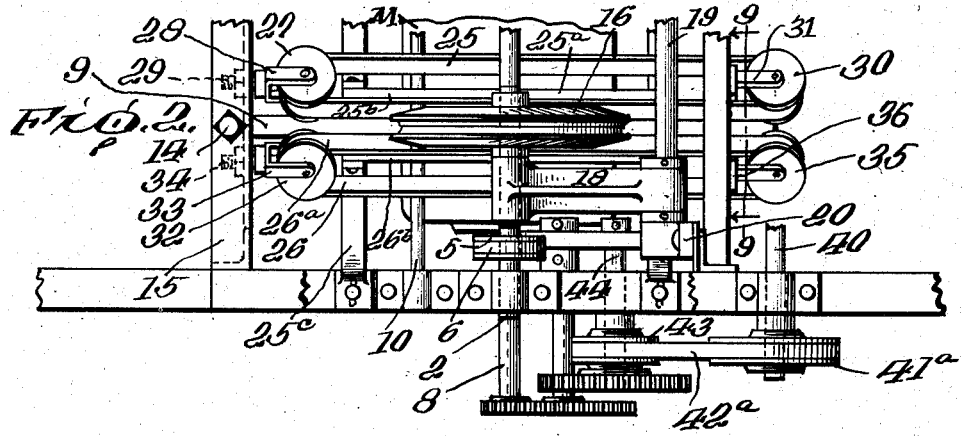

2,263,696

UNITED STATES PATENT OFFICE 2,263,696

AUTOMATIC MACHINE FOR DEVEINING SHRIMP

Ralph V. Grayson, Houston, Tex., assignor to Kroger Grocery & Baking Company, Cincinnati, Ohio, a corporation of Ohio Application December 28, 1939, Serial No. 311,402

18 Claims. (Cl. 17—2)

In my co-pending application Serial No. 309,662, filed December 16, 1939, I have described a machine for removing the sand vein from shrimp, which machine is fed by hand. The present invention has to do with an improvement in the machine of said application.

An object of the invention is to provide a means for feeding the shrimp one after another to the cutting disk for removing the sand vein from the shrimp.

A further object of the invention is to provide a yielding presser means for positively holding the shrimp against the gauging means which supports the same so as to insure that the channel cut in the shrimp during the de-veining of the same is of uniform depth.

A still further object of the invention is to provide a means whereby the gauging devices supporting the shrimp during the de-veining of the same can be readily adjusted relative to the cutting means so as to regulate the depth of cut according to the grade and size of the shrimp being operated upon.

These and other objects will in part be obvious and will in part be hereinafter more fully disclosed.

In the drawings—

Figure 1 is a side view of a machine embodying the improvements;

Fig. 2 is a plan view of a portion of the same;

Fig. 3 is an enlarged end view of the machine as viewed from the right in Figure 2, and with certain parts omitted for the sake of clearness;

Fig. 4 is a view showing more or less diagrammatically the cutter, the gauge for supporting the shrimp and the yielding presser roll which holds the shrimp against the gauging device and insures a uniform depth of cut;

Fig. 5 is an enlarged sectional view through the yielding presser roll;

Fig. 6 is an enlarged sectional view showing a portion of the cutting device and a portion of the yielding presser roll with a shrimp in position for operation of the cutting device;

Fig. 7 is an enlarged detail sectional view through the gauge bar and the cutting disk at the cutting point;

Fig. 8 is an enlarged detail section showing the feed belts, the gauge bar, the rigid members backing up the belts in the cutting region and also showing the portion of the presser roll, cutting disk and the gauge member associated therewith;

Fig. 9 is an enlarged detail section on the line 9—9 of Fig. 2, and

Fig. 10 is a detail on an enlarged scale showing a portion of the cutter disk and the approach of the saw teeth to the shell of the shrimp for the cutting of the same.

In the illustrated embodiment of the invention, the machine includes a cutting disk having saw teeth, which cutting disk is positively rotated about a fixed axis. Associated with the disk is a gauging device for supporting the shrimp. This gauging device has a slot extending longitudinally thereof through which the cutting disk projects. The gauging device is concave in transverse section, and the shrimp are placed one after another on this gauging device and carried along the same and thus presented to the cutting disk. The cutting disk cuts a channel in the shrimp along the crest or back portion thereof, which channel extends a sufficient distance into the flesh of the shrimp in order that the sand vein may be ruptured and completely removed from the shrimp. The shrimp are fed one after another along the supporting gauging bar by means of belts which have their adjacent faces inclining upwardly and outwardly away from each other. The shrimp are placed between these belts with the head end forward and they are fed along the gauging bar by the belts so that a channel is cut along the crest or back portion from the head to a point adjacent the tail. A presser roll made in two telescoping sections bears on the shrimp and holds the same against the gauge bar. The gauge bar is shiftable for different size shrimp, but is held in a fixed position during the operation of the machine. The sections of the presser roll are separated by springs and the peripheral side portions of the presser roll are shaped so as to contact with the feed belts, and it is this contact with the feed belts that drives the presser roll.

The presser roll is mounted so that it moves up and down as the size of the shrimp with which it contacts varies. The presser roll as it moves upward, opens through the action of the spring so as to provide a larger curved contacting surface for engagement with the shrimp.

Referring more in detail to the drawings, the machine includes a frame structure I preferably made of angle bars of the usual form, and it is not thought that a detail description of the frame structure is necessary. The machine is preferably provided with a plurality of units operating independently to de-vein the shrimp fed thereto. These units are all similar in construction and only one is being illustrated in the drawings. Mounted on the frame structure is a shaft 2 carrying a cutting disk 3. This cutting disk is provided with saw teeth. The points of alternate saw teeth lie substantially at opposite sides of the cutting disk. The saw teeth 4, 4 have their points lying substantially in the plane of one face of the disk, while the saw teeth 4a, 4a have their points lying substantially in the plane of the other face of the disk. The disk is of sufficient thickness so that the points of the saw teeth will cut a channel along the crest or back portion of the shrimp which is only sufficiently wide to permit the removal of the sand vein of a large or jumbo shrimp.

The shaft 2 carries a belt wheel 5 over which runs a belt 6. This belt engages a pulley 7 on the shaft 8 of a motor M. The shrimp are supported during the cutting of the same on a gauge bar 9 which is mounted on a supporting shaft 10 carried by brackets, one of which is indicated at 11. This gauge bar is slightly concave as indicated at 12. The gauge bar is slotted as indicated at 13 and the cutting disk 3 projects through this slot to an extent determined by the position of the gauge bar. An adjusting screw 14 extending through a cross bar 15 in the main frame structure bears on the left-hand end of the gauge bar and positions the same relative to the cutting disk. When the screw is turned down, the bar is swung on its pivotal supporting shaft 10 so as to raise the gauge bar relative to the cutting disk, and this will convey the shrimp to the cutting disk so that the channel cut along the crest or back portion of the shrimp will be of less depth. When the adjusting screw 14 is raised, then the gauge bar in the region of the cutter will be depressed and the channel cut in the shrimp will be of greater depth. The shrimp being operated upon by the cutting disk pass underneath a presser roll 16. This presser roll is journaled on a stud 17 carried by a bracket arm 18 which in turn is mounted on a sleeve supported by a shaft 19 between spaced collars 19a, 19a fixed thereto. The presser roll is free to move up and down and will be moved by gravity to its lowermost position.

As shown in Figure 6, the shrimp pass beneath the presser roll 16, raising the same. The presser roll will bear on the shrimp during the movement of the shrimp over the cutting disk and this will hold the shrimp close up to the gauge bar and insure a uniform depth of cut.

This presser roll 16 is preferably made of two sections 16a and 16b. Between the two sections is a series of springs 22, and also a series of springs 23. The sections of the presser roll are free to move laterally of the hub 24 of the presser roll, and the springs normally separate the sections. The position of the sections will be determined by the feed belts and the size of the shrimp as will be hereinafter more fully disclosed. The section 16a is provided with a curved inwardly projecting peripheral portion 16c, and the section 16b is provided with a similarly curved inwardly projecting peripheral portion 16d. These portions are curved so as to lie close to each other and they form a concave periphery for the presser roll, and this is the portion of the presser roll which contacts with the curved portion of the shrimp.

The shrimp are fed along the gauge bar by feeding belts 25 and 26. The belt 25 runs over a pulley 27 mounted on a bracket 28 carried by an adjustable stud 29 so that the bracket can be shifted for varying the tension on the belt. The belt 25 at its other end runs over a pulley 30 carried by a bracket 31. The belt 26 runs over a pulley 32 carried by a bracket 33 which in turn is mounted on an adjustable stud 34 which can be shifted to vary the tension on the belt 26. This belt at its other end runs over a pulley 35 carried by a bracket 36. The pulleys 27 and 30 are so positioned that the run 25a of the belt adjacent the cutting disk inclines upwardly and outwardly away from the plane of rotation of the cutting disk. The pulleys 32 and 35 are likewise inclined so that the run 26a of this belt inclines upwardly and outwardly in the opposite direction from the inclination of the run 25a of the belt 25. There is a plate 25b which lies directly back of the run 25a of the belt, and this plate is mounted on brackets 25c carried by the frame and is inclined so as to form a rigid support for the belt in the region where the shrimp are operated upon by the cutting disk 3. There is a similar plate 26b which backs up the belt 26 in the region where the shrimp are operated upon.

The section 16a of the presser roll 16 in the region adjacent the run 25a of the belt 25 is inclined as indicated at 36 to correspond to the inclination of the run 25a of the belt 25. The section 16b of the presser roll in the region adjacent the run 26a of the belt 26 is inclined as indicated at 37 to conform to the inclination of the belt run 26a of the belt 26.

When a shrimp passes beneath this presser roll, it will raise the presser roll to an extent depending upon the size of the shrimp. As the presser roll is raised, the springs will separate the sections, maintaining the inclined faces thereof in contact with the respective feeding belts adjacent the same. The shrimp S will pass along the gauge bar 9 and the advance end thereof will contact with the presser roll and raise the same. The roll is continuously turned by the belts and at the same speed of travel of the belts, so that the roll and the belts together grip the shrimp and feed it along the gauge bar so that the cutting disk will cut a narrow channel along the crest or back portion of the shrimp which is in contact with the gauge bar at a sufficient depth to completely rupture and remove the sand vein.

These feed belts may be operated in any suitable way. As illustrated, the pulley 30 carries a bevel gear 38 which meshes with a bevel gear 39 on a driving shaft 40. The pulley 35 carries a bevel gear 41 which meshes with a bevel gear 42 on the shaft 40. The shaft 40 at its outer end carries a belt wheel 41a over which a belt 42a runs. This belt is driven by a belt wheel 43 on a shaft 44, and the shaft 44 is driven through suitable reduction gearing from the shaft 8.

In order to wash away the ruptured parts as they are formed by the cutting saw teeth, a nozzle 45 is provided which is connected to a supply pipe 46 in any suitable way. This nozzle extends into the slot in the gauge bar and is so disposed that it directs a jet of water against the saw teeth of the cutting disk at the point where said teeth contact with the shell and the flesh of the shrimp, and as the parts are ruptured, the jet of water will wash said ruptured parts out of the cut channel leaving the shrimp entirely free of the sand vein. The ruptured parts drop into a pan 47 and will pass off with the flushing water through the spout 48.

The inclined faces 36 and 37 of the presser roll are knurled or roughened in any suitable way so that the belts will firmly grip the same.

The feed belts may also have their surfaces knurled or roughened in any suitable way so as to facilitate the turning of the presser roll and the feeding of the shrimp along the gauge bar to the cutting disk. These roughened surfaces of the feed belt will engage the shell of the shrimp and force it beneath the presser roll causing the roll to rise and the shrimp to pass onto the cutting disk.

When changing from the de-veining of shrimp of one grade to another grade, it is preferable to adjust the feed belts horizontally to either bring them a little closer together for the smaller size shrimp or to place them farther apart for the larger size shrimp. The lower edges of these belts are slightly above the gauge bar, and therefore, the belts can be readily shifted in the manner stated without interference with the gauge bar. The brackets carrying the belts are secured to the frame by bolts passing through the slots which permit the horizontal shifting of the feed belts, (See Fig. 9) and likewise the brackets which support the backing-up plates for the belts are mounted on the frame so that they can be shifted to correspond to the shifting of the belts. This mechanism whereby the parts are shifted is of the usual construction and will not need detail description.

The advance faces of the saw teeth are disposed at such an angle to the radii that the advance face approaches the shell bearing against the gauge bar while moving in an outward direction relative to the shrimp. (See Fig. 10.) Thus it is that the cutting teeth contact with the shell on the inside thereof first, and this greatly facilitates the cutting of the shell.

The operation of the machine is thought to be obvious from the detail description given above. As noted, there is a series of units and each is like the one described above. Preferably the machine includes four units so that the different units may be adjusted and set for operation upon shrimp which have had the heads removed, washed and graded ready for de-veining. One unit will be set to operate upon the small grade, another unit to operate upon the intermediate grade, and another unit to operate upon the large grade, while the fourth unit is set for operation upon the jumbo shrimp. There is an operator for each unit, and the shrimp after they are prepared ready for de-veining, is placed in receptacles at the feeding-in side of the machine, there being a receptacle for each unit. These receptacles are indicated diagrammatically at A. The operator removes the shrimp one at a time and places them on the feed belts with the head forward and the crest or back portion of the shrimp resting on the gauge bar. The belts will at once move the shrimp forward and carry the same beneath the presser roll which will rise and expand to conform to the size of the shrimp to be de-veined. The saw teeth of the cutting disk will contact with the shell and the fleshy portions of the shrimp directly beneath the shell which contains the sand vein. This ruptures the parts contacted with and forms a channel of sufficient width only to permit the complete removal of the sand vein. The jet of water washes away the ruptured parts as they are formed. The feed belts carry the shrimp away from the cutting disk and they are delivered by the feed belt into a receptacle B at the discharge side of the machine. All that is required of the operator is to place the shrimp one after the other on the gauge bar in range of the feed belts and the machine otherwise is fully automatic.

It is obvious that many changes in the details of construction may be made without departing from the spirit of the invention as set forth in the appended claims.

I claim:

1. A machine for de-veining shrimp comprising a rotary cutting disk, means for supporting and directing a shrimp to the cutting disk, a presser roll opposed to the cutting disk for holding the shrimp in contact with the supporting means during the cutting operation, and feeding means for feeding the shrimp along the supporting means and beneath the presser roll.

2. A machine for de-veining shrimp comprising a rotary cutting disk, means for supporting and directing a shrimp to the cutting disk, a presser roll opposed to the cutting disk for holding the shrimp in contact with the supporting means during the cutting operation, and feeding belts for feeding the shrimp along the supporting means and beneath the presser roll.

3. A machine for de-veining shrimp comprising a rotary cutting disk, means for supporting and directing a shrimp to the cutting disk, a presser roll opposed to the cutting disk for holding the shrimp in contact with the supporting means during the cutting operation, and feeding belts having their opposed surfaces inclined away from each other for engaging the shrimp and feeding the same along the supporting means and beneath the presser roll.

4. A machine for de-veining shrimp comprising a rotary cutting disk, means for supporting and directing a shrimp to the cutting disk, a presser roll opposed to the cutting disk for holding the shrimp in contact with the supporting means during the cutting operation, and feeding belts having their opposed surfaces inclined away from each other for engaging the shrimp and feeding the same along the supporting means and beneath the presser roll, said presser roll being mounted for free up and down movement and having telescoping sections spring pressed away from each other and into contact with said belts.

5. A machine for de-veining shrimp comprising a rotary cutting disk, means for supporting and directing a shrimp to the cutting disk, a presser roll opposed to the cutting disk for holding the shrimp in contact with the supporting means during the cutting operation, and feeding belts having their opposed surfaces inclined away from each other for engaging the shrimp and feeding the same along the supporting means and beneath the presser roll, said presser roll being mounted for free up and down movement and having telescoping sections spring pressed away from each other and into contact with said belts, said rotary cutting disk projecting above said supporting means for cutting a channel along the crest portion of the shell as it is fed along the supporting means.

6. A machine for de-veining shrimp comprising a rotary cutting disk, means for supporting and directing a shrimp to the cutting disk, a presser roll opposed to the cutting disk for holding the shrimp in contact with the supporting means during the cutting operation, feeding belts having their opposed surfaces inclined away from each other for engaging the shrimp and feeding the same along the supporting means and beneath the presser roll, said presser roll being mounted for free up and down movement and having telescoping sections spring pressed away from each other and into contact with said belts, said rotary cutting disk projecting above said supporting means for cutting a channel along the crest portion of the shell as it is fed along the supporting means, and means whereby the support for the shrimp may be adjusted relative to the cutting disk for varying the depth of cut into the flesh of the shrimp.

7. A machine for de-veining shrimp comprising a rotating cutting disk, a slotted gauge bar through which the cutting disk projects and along which the shrimp are fed to the cutting disk, feed belts disposed at each side of the gauge bar and having their opposed faces inclined upwardly away from each other for receiving the shrimp and feeding the same endwise along the gauge bar, and a presser roll opposed to the cutting disk for holding the shrimp in contact with the gauge bar during the cutting operation, said presser roll being rotated in timing with the travel of the belts.

8. A machine for de-veining shrimp comprising a rotating cutting disk, a slotted gauge bar through which the cutting disk projects and along which the shrimp are fed to the cutting disk, feed belts disposed at each side of the gauge bar and having their opposed faces inclined upwardly away from each other for receiving the shrimp and feeding the same endwise along the gauge bar, and a presser roll opposed to the cutting disk for holding the shrimp in contact with the gauge bar during the cutting operation, said presser roll being formed in sections spring pressed away from each other, each section having an inclined portion corresponding to the inclination of the respective belts and engaging the same so that the belts will rotate the presser roll.

9. A machine for de-veining shrimp comprising a rotating cutting disk, a slotted gauge bar through which the cutting disk projects and along which the shrimp are fed to the cutting disk, feed belts disposed at each side of the gauge bar and having their opposed faces inclined upwardly away from each other for receiving the shrimp and feeding the same endwise along the gauge bar, and a presser roll opposed to the cutting disk for holding the shrimp in contact with the gauge bar during the cutting operation, said presser roll being formed in sections spring pressed away from each other, each section having an inclined portion corresponding to the inclination of the respective belts and engaging the same so that the belts will rotate the presser roll, said belts and inclined portions of the presser roll being knurled so as to increase the frictional grip of the belts on the presser roll.

10. A machine for de-veining shrimp comprising a rotating cutting disk, a slotted gauge bar through which the cutting disk projects and along which the shrimp are fed to the cutting disk, feed belts disposed at each side of the gauge bar and having their opposed faces inclined upwardly away from each other for receiving the shrimp and feeding the same endwise along the gauge bar, and a presser roll opposed to the cutting disk for holding the shrimp in contact with the gauge bar during the cutting operation, said presser roll being formed in sections spring pressed away from each other, each section having an inclined portion corresponding to the inclination of the respective belts and engaging the same so that the belts will rotate the presser roll, said presser roll sections having inwardly curving and inwardly projecting curved portions overlying each other and forming a concave peripheral recess for engagement with the shrimp.

11. A machine for de-veining shrimp comprising a rotary cutting disk, a slotted gauge bar through which said cutting disk projects for supporting and directing the shrimp to the cutting disk, feed belts at each side of said gauge bar having their opposed faces inclining upwardly away from each other, a supporting plate for each feed belt extending along the gauge bar for causing said belts to travel in fixed paths while presenting the shrimp to the cutting disk, and a presser roll mounted for free up and down movement and disposed between said feed belts for engaging the shrimp and pressing the same against the gauge bar during the cutting of the same.

12. A machine for de-veining shrimp comprising a rotary cutting disk, a slotted gauge bar through which said cutting disk projects for supporting and directing the shrimp to the cutting disk, feed belts at each side of said gauge bar having their opposed faces inclining upwardly away from each other, a supporting plate for each feed belt extending along the gauge bar for causing said belts to travel in fixed paths while presenting the shrimp to the cutting disk, and a presser roll mounted for free up and down movement and disposed between said feed belts for engaging the shrimp and pressing the same against the gauge bar during the cutting of the same, said presser roll being formed in sections spring pressed away from each other and having inclined portions adjacent their peripheries corresponding to the inclination of the respective feed belts for contact with said feed belts in all positions of the up and down movements of the presser roll whereby said presser roll is driven by the feed belts.

13. A machine for de-veining shrimp comprising a rotary cutting disk, a slotted gauge bar through which said cutting disk projects for supporting and directing the shrimp to the cutting disk, feed belts at each side of said gauge bar having their opposed faces inclining upwardly away from each other, a supporting plate for each feed belt extending along the gauge bar for causing said belts to travel in fixed paths while presenting the shrimp to the cutting disk, and a presser roll mounted for free up and down movement and disposed between said feed belts for engaging the shrimp and pressing the same against the gauge bar during the cutting of the same, said presser roll being formed in sections spring pressed away from each other and having inclined portions adjacent their peripheries corresponding to the inclination of the respective feed belts for contact with said feed belts in all positions of the up and down movements of the presser roll whereby said presser roll is driven by the feed belts, said presser roll sections having inwardly curved peripheral projecting portions overlying each other and forming a concave portion for engagement with the shrimp.

14. A machine for de-veining shrimp comprising a rotary cutting disk, a slotted gauge bar through which said cutting disk projects for supporting and directing the shrimp to the cutting disk, feed belts at each side of said gauge bar having their opposed faces inclining upwardly away from each other, a supporting plate for each feed belt extending along the gauge bar for causing said belts to travel in fixed paths while presenting the shrimp to the cutting disk, a presser roll mounted for free up and down movement and disposed between said feed belts for engaging the shrimp and pressing the same against the gauge bar during the cutting of the same, said presser roll being formed in sections spring pressed away from each other and having inclined portions adjacent their peripheries corresponding to the inclination of the respective feed belts for contact with said feed belts in all positions of the up and down movements of the presser roll whereby said presser roll is driven by the feed belts, said presser roll sections having inwardly curved peripheral projecting portions overlying each other and forming a concave portion for engagement with the shrimp, and means for adjusting the position of the gauge bar relative to the cutting disk for varying the depth of cut into the flesh of the shrimp.

15. A machine for de-veining shrimp comprising a rotary cutting disk, a slotted gauge bar through which said cutting disk projects for supporting and directing the shrimp to the cutting disk, feed belts at each side of said gauge bar having their opposed faces inclining upwardly away from each other, a supporting plate for each feed belt extending along the gauge bar for causing said belts to travel in fixed paths while presenting the shrimp to the cutting disk, and a presser roll mounted for free up and down movement and disposed between said feed belts for engaging the shrimp and pressing the same against the gauge bar during the cutting of the same, said presser roll being formed in sections spring pressed away from each other and having inclined portions adjacent their peripheries corresponding to the inclination of the respective feed belts for contact with said feed belts in all positions of the up and down movements of the presser roll whereby said presser roll is driven by the feed belts, said presser roll sections having inwardly curved peripheral projecting portions overlying each other and forming a concave portion for engagement with the shrimp, said gauge bar having its upper face concave to conform in general to the transverse curvature of the shell of the shrimp.

16. A machine for de-veining shrimp comprising a rotary cutting disk, a slotted gauge bar through which said cutting disk projects for supporting and directing a shrimp to the cutting disk, feed belts extending alongside of the gauge bar for feeding the shrimp endwise to and away from the cutting disk, said feed belts having their opposed faces inclined away from each other in an upward direction, a presser roll disposed between the belts and engaging the shrimp for holding the same pressed against the gauge bar during the cutting operation, and means for directing a jet of water onto the cutting disk and into the channel cut in the shrimp for removing the ruptured parts as they are formed.

17. A machine for de-veining shrimp comprising a rotary cutting disk, a gauge bar having a slot through which said disk projects, means for shifting the gauge bar relative to the cutting disk for varying the depth of cut of the disk into the flesh of the shrimp, a presser roll opposed to said cutting disk for holding the shrimp in contact with the gauge bar during the cutting operation, and feeding means for feeding the shrimp along the supporting bar and beneath the presser roll.

18. A machine for de-veining shrimp comprising a rotary cutting disk, a gauge bar having a slot through which said disk projects, means for shifting the gauge bar relative to the cutting disk for varying the depth of cut of the disk into the flesh of the shrimp, a presser roll opposed to said cutting disk for holding the shrimp in contact with the gauge bar during the cutting operation, and feed belts extending along the gauge bar for feeding the shrimp for the cutting operation and for discharging the shrimp from the machine after it has been de-veined.

RALPH V. GRAYSON.